No. 701,768. Patented June 3, 1902.
F. M. & L. E. SHARP.
COTTON CHOPPER.
(Application filed Aug. 6, 1901.)
(No Model.) 2 Sheets—Sheet 1.
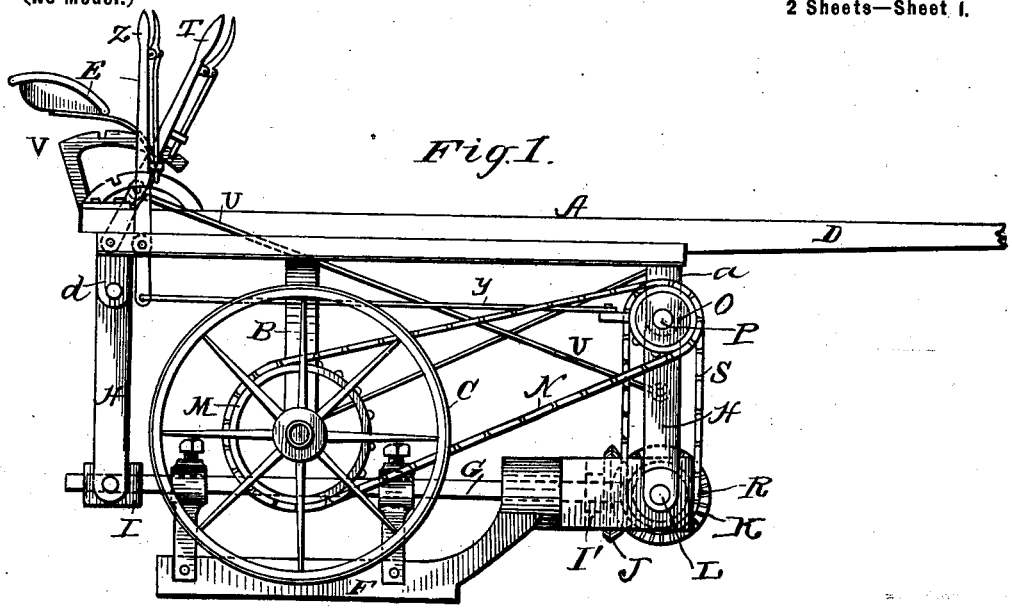
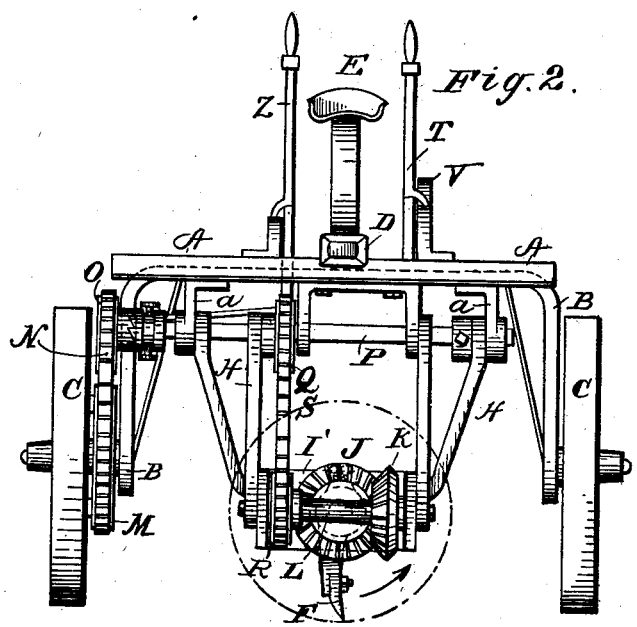
WITNESSES:
INVENTORS
Francis M. Sharp.
Lewis E. Sharp.
BY
ATTORNEYS No. 701,768. Patented June 3, 1902.
F. M. & L. E. SHARP.
COTTON CHOPPER.
(Application filed Aug. 6, 1901.)
(No Model.) 2 Sheets—Sheet 2.
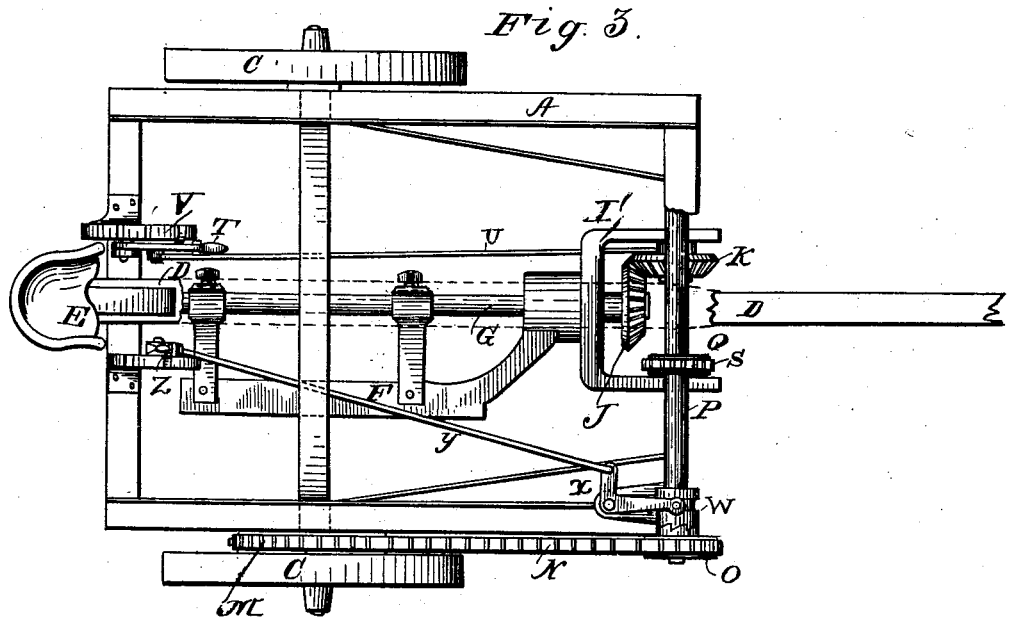
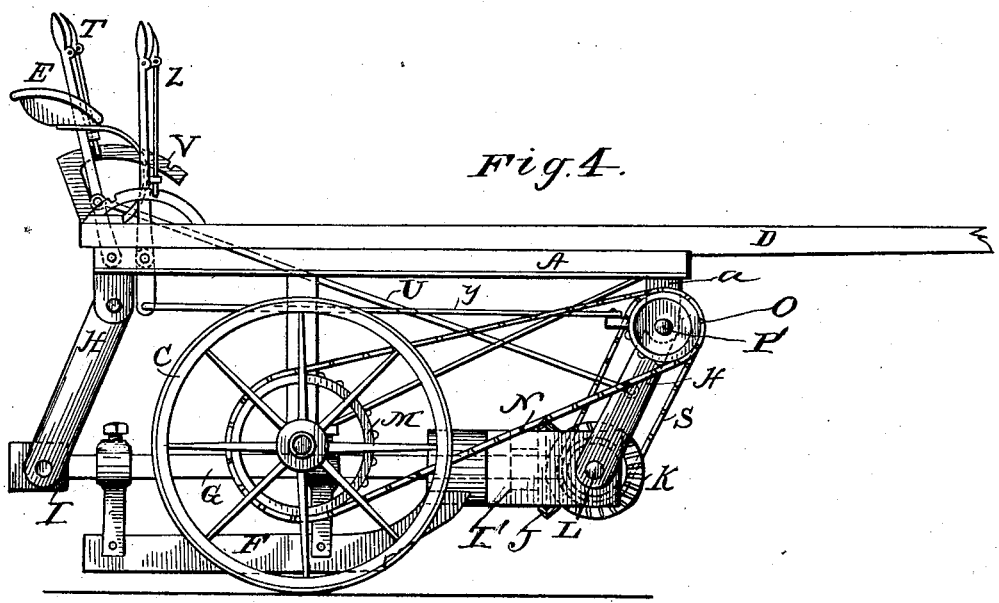
WITNESSES:
W. R. Edelin
Jos. A. Ryan
INVENTORS
Francis M. Sharp
Lewis E. Sharp
BY Munn & Co.
ATTORNEYS

UNITED STATES PATENT OFFICE.

FRANCIS M. SHARP AND LEWIS EVERT SHARP, OF PARTRIDGE, OKLAHOMA TERRITORY.

COTTON-CHOPPER.

SPECIFICATION forming part of Letters Patent No. 701,768, dated June 3, 1902.

Application filed August 6, 1901. Serial No. 71,083. (No model.)

*To all whom it may concern:*

Be it known that we, FRANCIS M. SHARP and LEWIS EVERT SHARP, citizens of the United States, residing at Partridge, in the county of Lincoln and Territory of Oklahoma, have invented a new and Improved Cotton-Chopper, of which the following is a specification.

Our invention is an improvement in that class of implements or machines which are adapted to be drawn over a drilled row of cotton-plants and to chop out portions of the crop, thus forming gaps in the row and leaving the plants in bunches or hills. We have devised a new construction and combination of parts whereby the cutter or chopping device, which is adapted to rotate when in action, may be set to work at different depths or may be thrown up entirely out of action, as conditions require.

In the drawings, Figure 1 is a side view of our improved machine. Fig. 2 is a front view of the same. Fig. 3 is a plan view. Fig. 4 is a side view showing the cutter or chopper raised and thrown out of action.

The main frame A of the machine is attached to and supported in horizontal position upon a bent axle B, having broad tread, running, or transporting wheels C, which are of large size. A pole or tongue D is secured to the center of the frame A, and a seat E for the driver is located on the rear end of the same.

The rotary cutter or chopping device F is arranged horizontally upon a shaft G, having its bearings in a frame which is mainly composed of bars H, pivoted to lugs or brackets $a$, pendent from the main frame A. The said bars H are arranged in pairs at each end of the frame A and adapted to swing in the direction of the length of the latter. The chopper-shaft G is journaled at its rear end in the block I and at its front end in a clevis-shaped frame I', having a pivotal connection with the lower ends of the pairs of bars H.
A bevel-gear J is fixed on the forward end of the chopper-shaft G (see Fig. 3) and meshes with a similar gear K, geared upon a shaft L, having its bearings in the lower end of the forward-swinging bars H. Rotary motion is communicated to the chopper-shaft G from one of the running-wheels C by the following means: A sprocket-wheel M is arranged on the inner side of one of the said wheels C, and a sprocket-chain N runs thereon and extends to a smaller sprocket-wheel O, which is keyed upon the shaft P, having its bearings in the front lugs or brackets $a$ of the main frame A. Another sprocket-wheel Q is mounted on the shaft P, and a similar wheel R is keyed on the short shaft L, arranged contiguous to the front end of the chopper-shaft G. A sprocket-chain S runs on these two sprocket-wheels Q and R. It will be understood that the sprocket-wheel M is fixed to the hub of the adjacent transporting-wheel C, so that when the machine is drawn forward the said sprocket-wheel will be rotated and motion thereby communicated to the shaft P and from it to the shaft L, which will in turn rotate the chopper-shaft G through the medium of the bevel-gears J and K. It is further apparent that the arrangement of parts is such that this rotary motion will be communicated whatever be the adjustment or angle of the swinging frame H. In other words, the chopper F will be rotated as well when the bars H are inclined rearward, as shown in Fig. 4, as when the said bars are in vertical position, as shown in the remaining figures. Such rearward adjustment or inclination of the swinging frame H is required for the purpose of varying the depth at which the cutter or chopper F works in the soil, also for raising the said cutter sufficiently to prevent its contact with the soil or growing crop, as when the machine is being drawn from one point to another on the farm or when stored out of use or while being shipped from one place to another. The means for thus adjusting the swinging frame H consists of a hand-lever T, pivoted adjacent to the driver's seat, and a rod U, extending forward therefrom and pivoted to one of the forward-swinging bars H, as shown in Figs. 1, 3, and 4. The said lever T is provided with a spring pawl or catch for locking it in any adjustment to an arc rack-bar V.

For the purpose of throwing the chopper out of action—*i. e.*, preventing its rotation when required—we apply a clutch W (see Figs. 2 and 3) to the shaft P and operate it through the medium of an elbow-lever X, (see Fig. 3,) a rod Y, attached thereto, and a hand-lever Z, arranged in proximity to the driver's seat E and provided with means for locking it, as in the case of the lever T, before referred to. The said clutch W has a spline connection with the shaft P, upon which it slides and engages a similar clutch formed on the hub of the sprocket-wheel O, which rotates free on the shaft. It will therefore be understood that by adjusting the lever Z forward or back the clutch W will be moved into or out of engagement with the sprocket-wheel O and the chopper-shaft G thereby thrown into or out of action accordingly.

The cutter or chopper F is shown in the shape of a sleigh or sled runner and is constructed of steel and provided with a beveled or sharpened edge. It is connected with the shaft G by means of radial arms and a hub, as shown in Figs. 1 and 2, and clamp-screws are applied, as shown, for securing it in the required position on the shaft. By this means of adjustment the cutter may be easily removed from the shaft G when required for the purpose of sharpening it anew.

By the above-described construction, arrangement, and combination of parts we produce a machine which is well adapted for its purpose and whose chopper or cutter may be easily adjusted to the varying conditions of the growing crop upon which it is to be used.

It will be understood that the knives or blades of the chopper F may be provided in different lengths and be used interchangeably, it being preferred to employ a cutter-blade about as long as the distance between the rows being chopped, and by starting the machine in at a gap or cut in the row the implement will check-row. The sprocket-wheel Q or the sprocket on the main wheel should be of different sizes to suit the knives.

What we claim is—

1. The improved cotton-chopper comprising a main frame, bent axle, and transporting-wheels, and a supplemental swinging frame which is pivoted to the main frame and adapted to swing in the direction of the travel of the machine, the means for suspension being bars H arranged at front and rear as shown, a rotary shaft arranged longitudinally in the pendent frame and provided with a chopper, a horizontal shaft arranged in the front portion of the supplemental frame and geared with the chopper-shaft, a second horizontal shaft supported in fixed bearings on the main frame, sprocket-gearing connecting the two horizontal shafts, means for imparting rotation to the upper horizontal shaft from one of the transporting-wheels, and lever mechanism for adjusting the swinging frame and connected parts forward or back and thus higher or lower without interrupting the operation of the chopper as shown and described.

2. The improved cotton-chopper, comprising the main frame transporting-wheels therefor, the supplemental frame comprising two pairs of bars pivoted to and pendent from such main frame, a rotary chopper carried in the supplemental frame, sprocket and bevel gearing connecting the chopper-shaft with one of the transporting-wheels, and a clutch, a rod and a hand-lever arranged as described, for throwing the chopper into and out of action, substantially as shown and described.

FRANCIS M. SHARP.
LEWIS EVERT SHARP.

Witnesses:
G. W. BEAR,
AUSTIN ELLIS.